(No Model.)

H. B. EARECKSON.
NUT LOCK.

No. 536,073. Patented Mar. 19, 1895.

WITNESSES:
William Gaebel.

INVENTOR
H. B. Eareckson
BY Munn & Co.
ATTORNEYS.

UNITED STATES PATENT OFFICE.

HENRY B. EARECKSON, OF NEW YORK, N. Y.

NUT-LOCK.

SPECIFICATION forming part of Letters Patent No. 536,073, dated March 19, 1895.

Application filed December 27, 1894. Serial No. 533,080. (No model.)

*To all whom it may concern:*

Be it known that I, HENRY B. EARECKSON, of New York city, in the county and State of New York, have invented a new and Improved Nut-Lock, of which the following is a full, clear, and exact description.

The object of the invention is to provide a new and improved nut lock, which is simple and durable in construction, and arranged to positively lock the nut in place when screwed up.

The invention consists of an arm pivoted on the nut and adapted to swing into recesses formed on the outer end of the bolt and in the nut.

The invention also consists in certain parts and details and combinations of the same, as will be hereinafter fully described and then pointed out in the claims.

Reference is to be had to the accompanying drawings, forming a part of this specification, in which similar letters of reference indicate corresponding parts in all the views.

Figure 1:
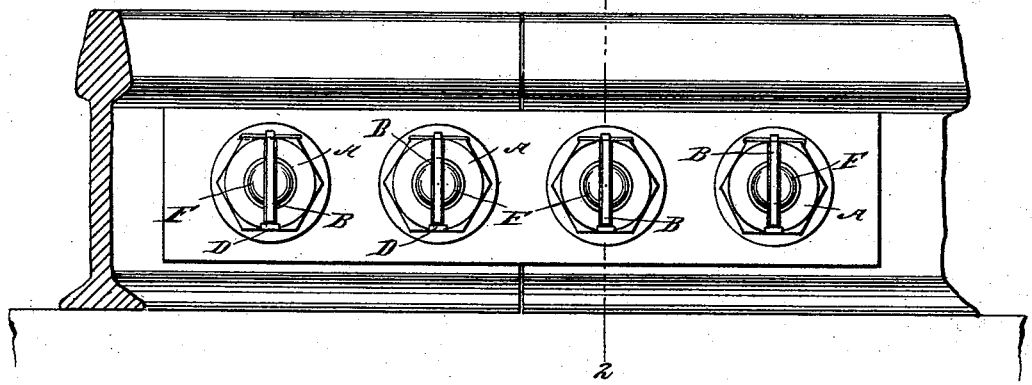
Figure 2:
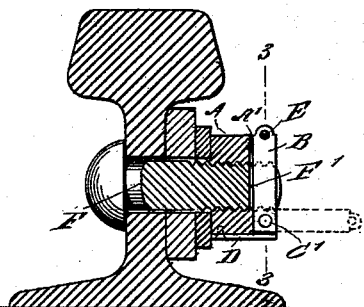

Figure 1 is a side elevation of the improvement as applied on railroad rails. Fig. 2 is a transverse section of the same, on the line 2—2 of Fig. 1; and Fig. 3 is an enlarged sectional front elevation of the same on the line 3—3 of Fig. 2.

Figure 3:
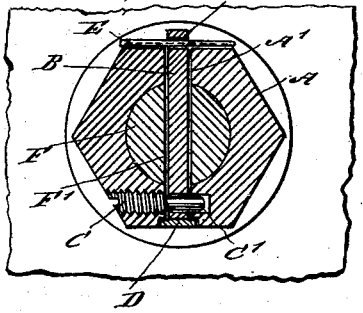

The improved nut lock is provided on the nut A with a diametrically extending recess A', formed at the front end of the nut, and in this recess is arranged an arm B pivoted at one end on the pintle C' formed on a screw C screwing in the side of the nut A, as plainly illustrated in Fig. 3. Against the pivoted end of the arm B presses the free end of a spring D, secured on the nut, as plainly shown in Figs. 2 and 3, so that the said arm B is normally held either in a locked position in the recess A', or in an unlocked open position, as indicated in dotted lines in Fig. 2.

On the free end of the arm B is formed an opening B' adapted to be engaged by a pin E, driven through the opening and abutting against one side of the nut A, so as to form an additional lock for the arm, to hold the latter in place. The arm B is adapted to swing into a diametrical recess F' formed in the outer end of the bolt F on which the nut A screws, it being understood that in order to screw up the nut A on the bolt F, it is necessary to first swing the arm B into an outermost position, as indicated in dotted lines in Fig. 2.

When the nut is screwed up and the recesses A' and F' register, then the arm B is swung shut so as to pass into the recess F' and the outer end of the recess A', so that a turning of the nut is prevented by the cross arm B. The pin E is then introduced so as to securely lock the arm B in position on the nut A.

This nut lock can be used for various purposes, but is more especially designed as a lock on railroad rails, joints, and on vehicle axles, such for instance as shown and described in the application for Letters Patent of the United States, Serial No. 533,079, filed of even date herewith.

Having thus described my invention, I claim as new and desire to secure by Letters Patent—

1. In a nut-lock, the combination of a transversely slotted nut, having a perforation formed at one of its sides and extending at right angles to the said transverse slot, that portion of said perforation on one side of the slot being screw-threaded and the portion on the other side being of reduced diameter, an arm adapted to fold in said slot, having a perforation corresponding to the reduced part of the perforation in the nut, and a screw having a threaded body portion adapted to fit the threaded part of the perforation in the nut, the tip of said screw being plain and extending through the perforation in the arm into that part of the perforation in the nut on the other side of said slot, substantially as set forth.

2. In a nut lock the combination of a transversely slotted nut, an arm pivoted at one end to said nut and adapted to fold down in said slot therein, the free end of said arm extending beyond the opposite side of the nut and being perforated, and a locking pin extending through the perforation in the free end of the said arm and bearing at its ends against the flat face of the nut on each side of the end of the slot, substantially as set forth.

HENRY B. EARECKSON.

Witnesses:
THEO. G. HOSTER,
C. SEDGWICK.